UNITED STATES PATENT OFFICE.

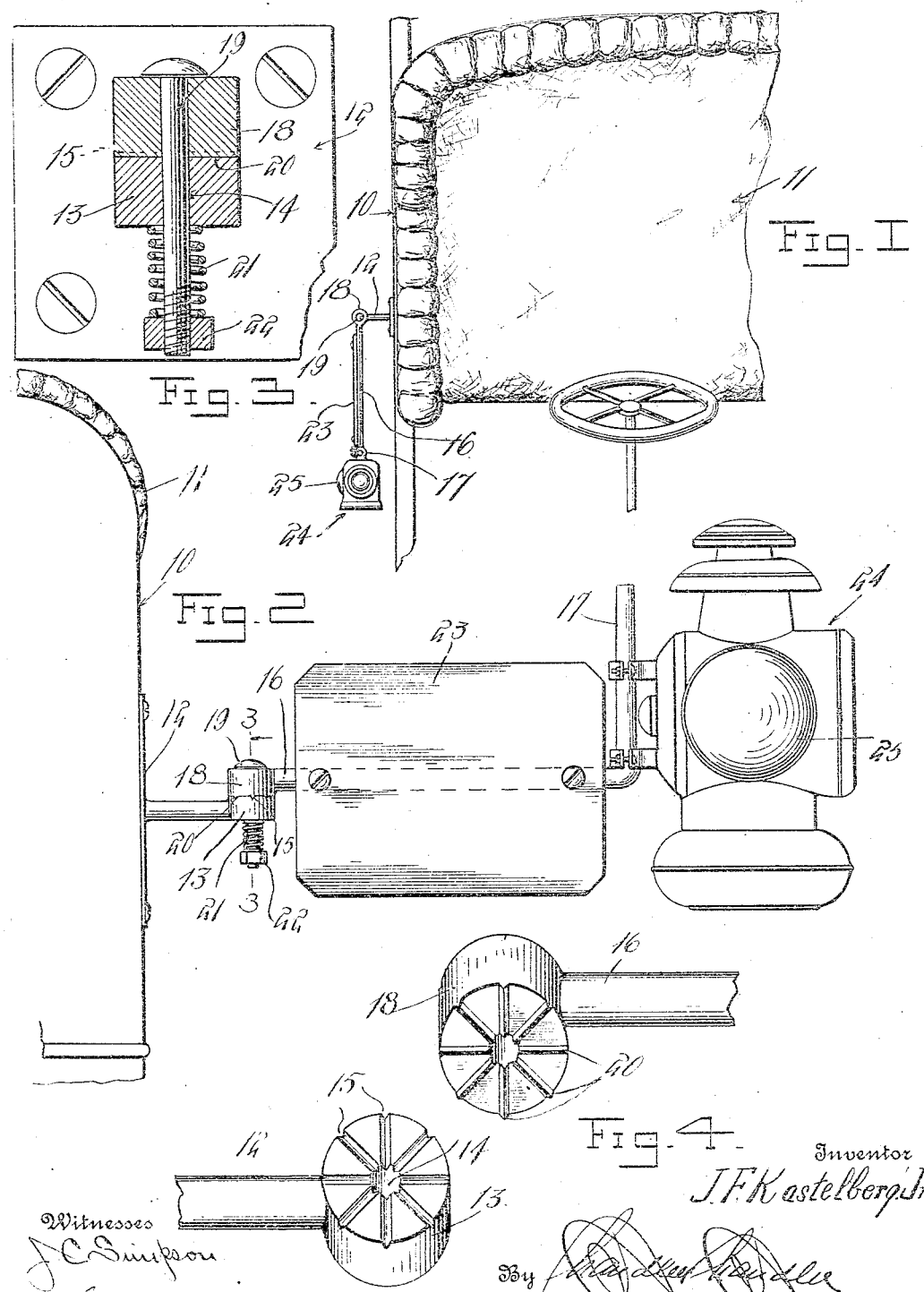

JOSEPH F. KASTELBERG, JR., OF RICHMOND, VIRGINIA.

AUTOMOBILE-SIGNAL.

1,160,719.

Specification of Letters Patent. Patented Nov. 16, 1915.

Application filed April 12, 1913. Serial No. 760,655.

*To all whom it may concern:*

Be it known that I, JOSEPH F. KASTELBERG, Jr., a citizen of the United States, residing at Richmond, in the county of Henrico, State of Virginia, have invented certain new and useful Improvements in Automobile-Signals; and I do hereby declare the following to be a full, clear, and exact description of the invention, such as will enable others skilled in the art to which it appertains to make and use the same.

This invention relates to automobile signals.

The object of the invention resides in the provision of a signal which can be readily associated with an automobile, and easily set so as to indicate to automobiles following that the advance automobile is about to turn to the left, or there is not room enough to pass, or that a dangerous crossing is directly ahead and that it is inadvisable to crowd upon the advance automobile.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a fragment of an automobile showing the signal associated therewith the latter being in inactive position; Fig. 2, a rear view of what is shown in Fig. 1 with the signal set in active position; Fig. 3, a section on the line 3—3 of Fig. 2, and Fig. 4, a detail view showing the coöperating faces of the hinge joint between the bracket and the signal carrying arm.

Referring to the drawings 10 indicates the side of an automobile and 11 the operator's seat. Secured to the side 10 adjacent the seat 11 is a bracket arm 12 the outer end of which is enlarged as at 13 and provided with a vertical passage 14. The upper side of the enlarged end 13 of the arm 12 is provided with a plurality of radial grooves 15 for a purpose that will presently appear.

The invention further includes a signal carrying arm 16 one end of which is bent upwardly as at 17 while the other end thereof is enlarged as at 18. Carried by the enlarged end 18 is a bolt 19 which extends through the passage 14 to pivotally secure the arm 16 to the arm 12 for swinging movement in a horizontal plane. The lower side of the enlarged end 18 is provided with a plurality of radial ribs 20 corresponding in number and position to the grooves 15 in the enlarged end 13 of the arm 12. As the arm 16 is rotated the ribs 20 will interchangeably seat in the grooves 15 respectively. The ribs 20 are yieldingly held seated in the groove 15 by means of a spring 21 which encircles the bolt 19 and bears at its upper end against the under side of the enlarged end 13 of the arm 12. The lower end of the spring 21 bears against a nut 22 adjustably threaded on the bolt 19 for varying the tension of said spring 21. By this construction it will be apparent that the arm 16 can be manually swung on its pivot, but will be held in set position by the engagement of the ribs 20 in the grooves 15, which engagement is intensified by the action of the spring 21.

Mounted on the arm 16 is a signal plate 23 which is preferably painted red so as to be readily observed in the day time. Mounted on the end 17 of the arm 16 is a lamp 24 provided with the usual red lens 25.

When the arm 16 is set in the position shown in Fig. 1 neither the signal plate 23 nor the lens 25 will be visible to the occupants of automobiles following the automobile with which the signal is associated. However, when the signal is operated to the position shown in Fig. 2 the signal plate 23 will be visible in the day time and the lens 25 of the lamp at night to the occupants of automobiles in the rear of the particular automobile with which the signal is associated. When the signal is set as shown in Fig. 2 ample warning shall have been given to prevent possible accident under conditions previously referred to.

What I claim is:—

An automobile signal comprising a bracket arm provided with means for attachment to the side of an automobile, an enlarged head on the outer end of said arm provided with a vertical passage, a signal carrying arm having its inner end enlarged, a bolt carried by said inner end and rotatably engaged in the passage of the first named arm, a nut threaded on said bolt, a spring encircling the bolt and bearing at one end against said nut and at its other end against the head of the first named arm, whereby the tension of the spring may be varied by adjusting the nut, a signal plate carried by the second named arm, and a lateral extension at the free end of the second named arm to which a signal lamp is adapted to be secured.

In testimony whereof, I affix my signature, in the presence of two witnesses.

JOSEPH F. KASTELBERG, Jr.

Witnesses:
 JOHN P. LEARY,
 ALFRED J. KIRSH.